(12) United States Patent
Rozy et al.

(10) Patent No.: US 8,567,751 B2
(45) Date of Patent: Oct. 29, 2013

(54) INLINE ASEPTIC VALVE

(75) Inventors: Yoram Rozy, Sunnyvale, CA (US);
Mark R. Embury, Fremont, CA (US);
Paul D. Otten, San Jose, CA (US)

(73) Assignee: Asepco, Mountain View, CA (US)

( * ) Notice: Subject to any disclaimer, the term of this patent is extended or adjusted under 35 U.S.C. 154(b) by 444 days.

(21) Appl. No.: 12/852,044

(22) Filed: Aug. 6, 2010

(65) Prior Publication Data
US 2012/0032098 A1 Feb. 9, 2012

(51) Int. Cl.
*F16K 7/04* (2006.01)

(52) U.S. Cl.
USPC ............ 251/7; 251/251; 251/366; 604/250

(58) Field of Classification Search
USPC ........... 251/4–8, 335.1, 335.2, 358, 366, 251; 604/250
See application file for complete search history.

(56) References Cited

U.S. PATENT DOCUMENTS

| | | | | |
|---|---|---|---|---|
| 2,381,544 A * | 8/1945 | Jacobsen | ...................... | 251/331 |
| 2,721,052 A * | 10/1955 | Hull | .................. | 251/6 |
| 2,770,439 A * | 11/1956 | Stafford et al. | ................ | 177/73 |
| 2,841,357 A * | 7/1958 | Little | ................. | 251/6 |
| 2,987,292 A * | 6/1961 | Teson et al. | ....................... | 251/6 |
| 3,086,797 A * | 4/1963 | Webb | ............................ | 285/242 |
| 3,197,173 A * | 7/1965 | Taubenheim | ..................... | 251/6 |
| 3,744,524 A * | 7/1973 | Blau | ............................. | 137/636 |
| 3,826,461 A | 7/1974 | Summerfield et al. | | |
| 3,920,215 A * | 11/1975 | Knauf | ................................ | 251/7 |
| 4,322,054 A * | 3/1982 | Campbell | .......................... | 251/5 |
| 4,378,013 A * | 3/1983 | LeFevre | ......................... | 604/250 |
| 4,518,145 A * | 5/1985 | Keltz et al. | ........................ | 251/5 |
| 4,682,755 A * | 7/1987 | Bernstein et al. | .................. | 251/4 |
| 4,786,028 A * | 11/1988 | Hammond | ....................... | 251/7 |
| 4,800,920 A | 1/1989 | Yusko, Jr. et al. | | |
| 5,098,060 A * | 3/1992 | Mogler et al. | ..................... | 251/7 |
| 5,127,626 A * | 7/1992 | Hilal et al. | ................. | 251/149.1 |
| 5,207,409 A * | 5/1993 | Riikonen | .......................... | 251/7 |
| 5,992,818 A * | 11/1999 | Jones et al. | ........................ | 251/7 |
| 6,361,016 B1 | 3/2002 | Schulz | | |
| 6,536,738 B2 | 3/2003 | Inoue et al. | | |
| 6,736,163 B1 * | 5/2004 | Partanen | ....................... | 137/551 |
| 6,755,388 B2 | 6/2004 | Furukawa et al. | | |
| 6,948,696 B1 * | 9/2005 | Aanonsen et al. | ................. | 251/4 |
| 6,976,664 B2 | 12/2005 | Welch et al. | | |
| 7,641,170 B2 * | 1/2010 | Spray et al. | ........................ | 251/6 |
| 7,775,501 B2 * | 8/2010 | Kees | ................................ | 251/7 |
| 2004/0033108 A1 * | 2/2004 | Raftis et al. | ...................... | 405/37 |
| 2010/0114041 A1 * | 5/2010 | Avery et al. | ................... | 604/250 |

* cited by examiner

*Primary Examiner* — John K Fristoe, Jr.
*Assistant Examiner* — Marina Tietjen
(74) *Attorney, Agent, or Firm* — Edward S. Wright

(57) ABSTRACT

Inline valve assembly having a body with an axial bore and guide slots extending in a direction perpendicular to the bore, a flexible tubular liner having an axially extending flow passageway with a generally cylindrical side wall disposed in and supported by the bore, throttling pins mounted in the guide slots in engagement with the side wall on opposite sides of the liner, and cam members rotatively mounted on the valve body for urging the pins together against the side wall to restrict flow through the passageway.

21 Claims, 4 Drawing Sheets

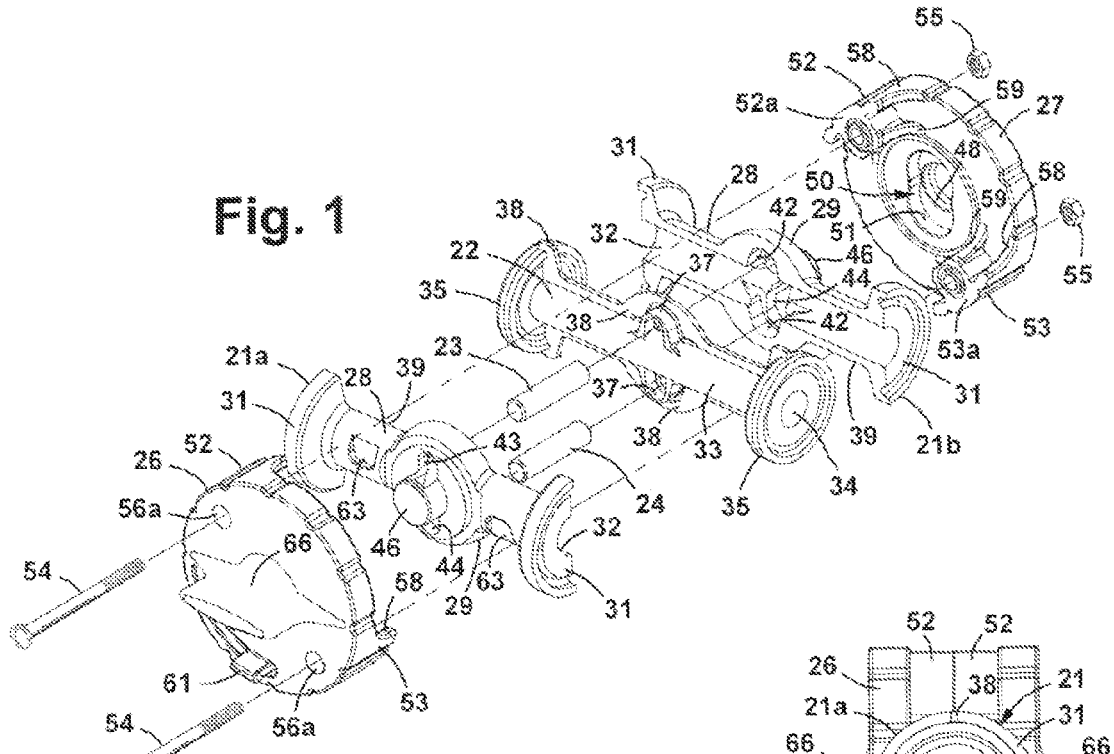
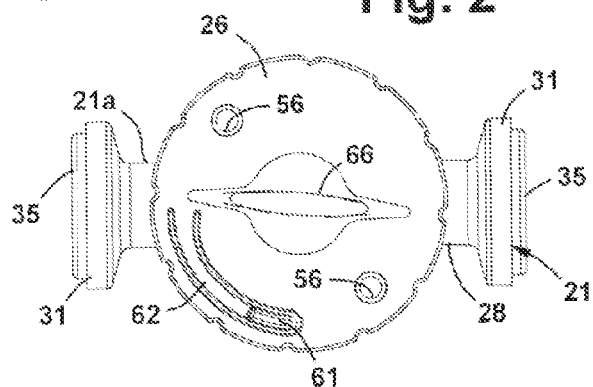
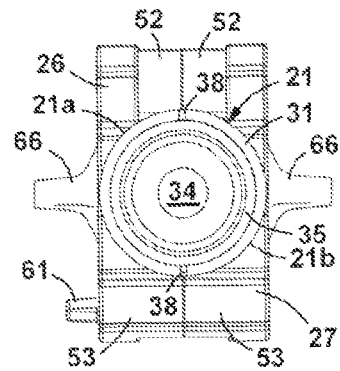
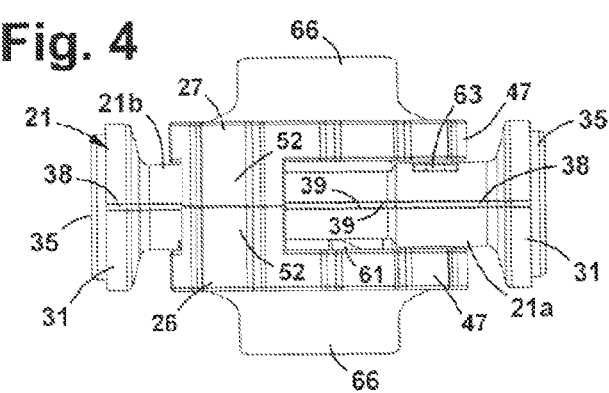

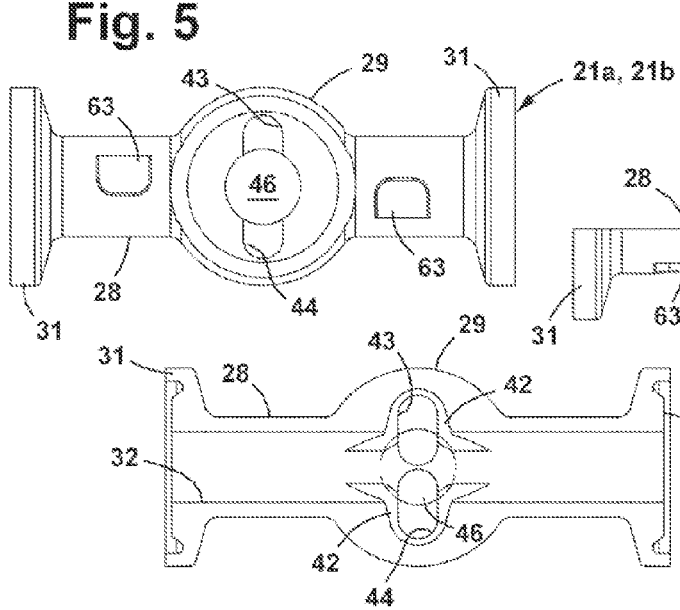
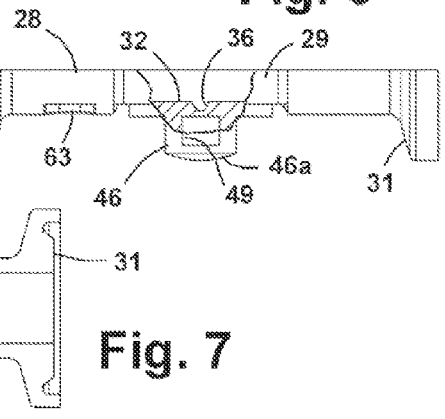
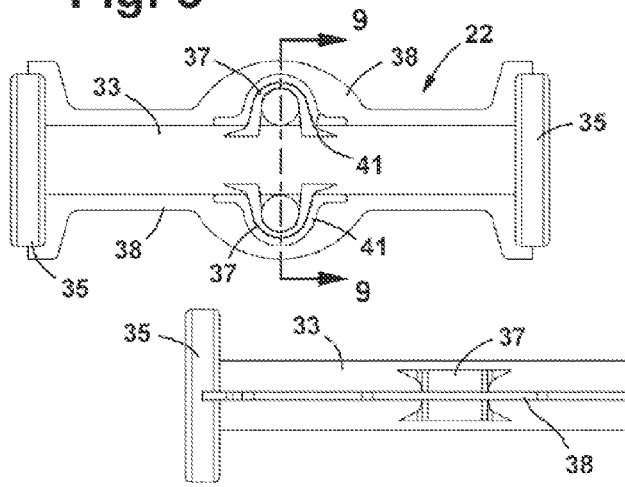
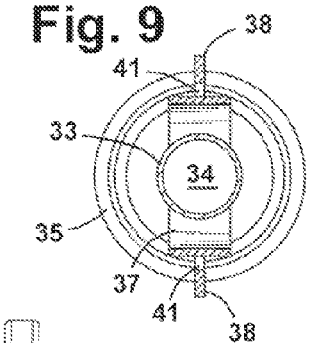
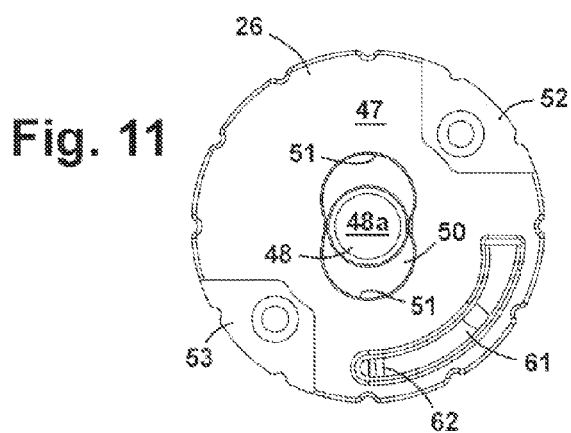
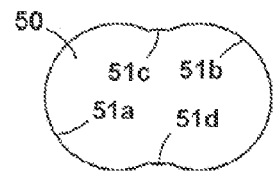

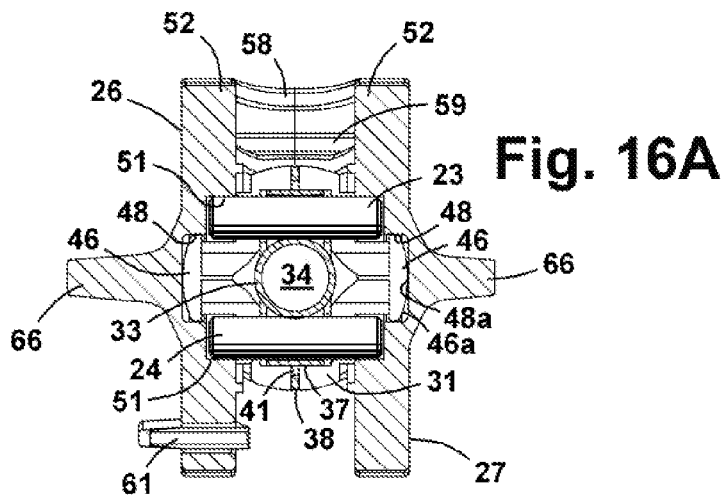
Fig. 16A
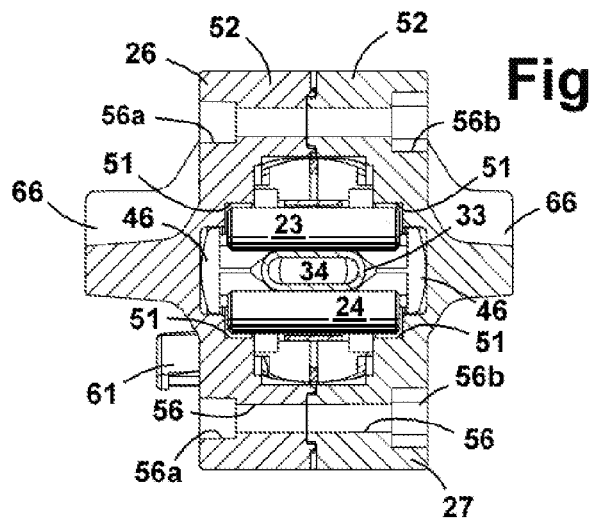
Fig. 16B
Fig. 16C
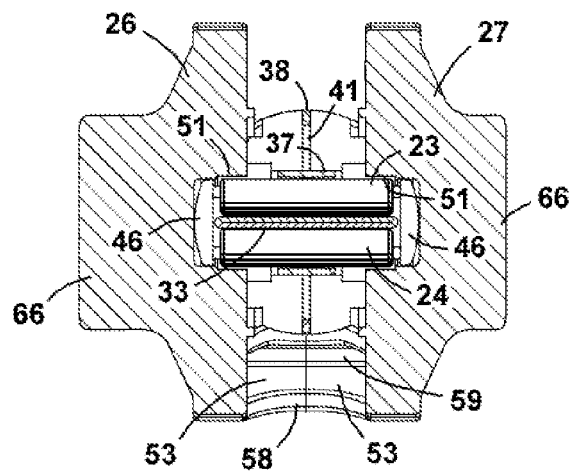

INLINE ASEPTIC VALVE

BACKGROUND OF THE INVENTION

1. Field of Invention

This invention relates generally to valves and, more particularly, to an inline valve for use in aseptic applications in fields such as biotechnology, food processing, and the pharmaceutical field.

2. Related Art

Heretofore, there have been a number of attempts to provide inline valves for use in aseptic or sterile environments. Such valves have typically been in the form of so-called "pinch valves" which have a passageway within an elastic tube that is pinched closed from one side to restrict flow through the passageway. Pinching the tube from only one side deforms or stretches the side wall the full diameter of the tube, stressing and straining the elastic material and leading to early failure of the valve. In addition, such valves may have crevices and other areas in which contamination can collect, making them difficult to maintain and less desirable for use in aseptic or sterile environments.

Examples of these "pinch valves" are found in U.S. Pat. Nos. 6,976,664, 6,775,388, 6,536,738, 6,361,016, 4,800,920, and 3,826,461.

OBJECTS AND SUMMARY OF THE INVENTION

It is, in general, an object of the invention to provide a new and improved inline valve assembly which is particularly suitable for use in aseptic or sterile environments.

Another object of the invention is to provide an inline valve assembly of the above character which overcomes the limitations and disadvantages of valve assemblies heretofore provided.

These and other objects are achieved in accordance with the invention by providing an inline valve assembly having a flexible tubular liner with an axially extending passageway, a pair of laterally movable pins on opposite sides of the liner for squeezing the walls of the liner together to restrict flow through the passageway, guides constraining the pins for movement perpendicular to the axis of the passageway, and cam members rotatable about an axis parallel to the pins for urging the pins together to squeeze both sides of the liner in a substantially identical manner to restrict flow through the passageway.

BRIEF DESCRIPTION OF THE DRAWINGS

FIG. 1 is an exploded isometric view of one embodiment of an inline valve assembly according to the invention.

FIG. 2 is a front elevational view of the embodiment of FIG. 1.

FIG. 3 is a side elevational view of the embodiment of FIG. 1.

FIG. 4 is a top plan view of the embodiment of FIG. 1.

FIG. 5 is a front elevational view of one section of the valve body in the embodiment of FIG. 1.

FIG. 6 is a top plan view, partly broken away, of the section of the valve body shown in FIG. 5.

FIG. 7 is a rear elevational view of the section of the valve body shown in FIG. 5.

FIG. 8 is a front elevational view of one section of the liner in the embodiment of FIG. 1.

FIG. 9 is a cross-sectional view taken along line 9-9 in FIG. 8.

FIG. 10 is a top plan view of the liner shown in FIG. 8.

FIG. 11 is a rear elevational of one of the cam members in the embodiment of FIG. 1.

FIG. 12 is an enlarged plan view showing the curvature of the cam surfaces in the embodiment of FIG. 1.

FIGS. 16A-16C are vertical sectional views showing the valve assembly in the embodiment of FIG. 1 in the fully open, partially open, and closed positions of FIGS. 13A-13C.

DETAILED DESCRIPTION

Figure 13A:
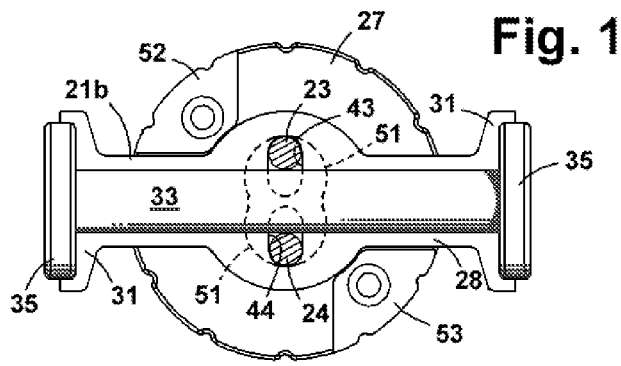
FIGS. 13A-13C are operational views showing the valve assembly in the embodiment of FIG. 1 in fully open, partially open, and closed positions.

As illustrated in FIG. 1, the valve assembly includes a split valve body 21, a tubular diaphragm or liner 22, throttling pins 23, 24 for squeezing the walls of the liner together to restrict flow through the valve, and cam members 26, 27 rotatively mounted on the valve body for adjusting the pins to control flow through the valve.

Valve body 21 is formed in two sections 21a, 21b, which are identical. As shown in FIGS. 5-7, each section has an elongated housing 28 of semicircular cross section, with an enlarged central hub 29 and connecting flanges 31, 31 at opposite ends of the body. A circular bore 32 extends axially within the valve body and through the flanges. The flanges are shown as being in the form of Tri-Clamp® fittings, but they can be of any suitable type that will provide leakproof, sanitary connections to the line through which flow is to be controlled. The body can be fabricated of stainless steel or a rigid plastic material, such as polysulfone, or other suitable material.

Diaphragm or liner 22 has a tubular body with a cylindrical side wall 33 surrounding an axially extending flow passageway 34, with Tri-Clamp® gaskets 35, 35 at opposite ends thereof. The liner is fabricated of a flexible, elastic material such as EPDM rubber, a synthetic fluoropolymer such as polytetrafluoroethylene (PTFE) sold under the trademark Teflon, or other suitable elastomer, and the tubular body and gaskets are molded together as a continuous, streamlined, unitary structure with no crevices or other areas in which contamination can collect. Although the gaskets are shown as being Tri-Clamp® gaskets in this particular embodiment, they can be of any suitable type consistent with the connectors at the ends of the valve body.

The side wall of the liner is received in the bore of the valve body, with gaskets 35, 35 interfitting in sealing engagement with the outer faces of connecting flanges 31, 31. The side wall fits snugly in the bore and is fully supported by the metal body so that a very thin liner can sustain high pressures without bursting or bulging. In one presently preferred embodiment, for example, the liner has a wall thickness of only 0.030 inch and is capable of sustaining pressures on the order of 1,000 psi, or higher. Cavities 36, 36 with curved side walls are formed in the valve body in communication with opposite sides of the bore between the pin slots to permit controlled extension or expansion of the liner in a direction parallel to the pins as it is squeezed between them.

The liner also has loops 37, 37 on opposite sides of the tubular body for receiving the throttling pins, and longitudinally extending radial flanges 38, 38 which are clamped between the facing surfaces 39, 39 of the two halves of the valve body to further support the liner and to prevent it from collapsing under negative pressures. These flanges also fill the space between the two halves of the body so there are no crevices or other areas where contamination can collect. Gaps 41, 41 are provided between the loops and the flanges to permit the portions of the side wall engaged by the pins to deflect freely, and cavities 42, 42 are formed in the hub sections of the valve body to accommodate the loops.

Throttling pins 23, 24 are mounted in oblong slots 43, 44 in the hub portions of the two sections of the valve body on opposite sides of the bore. The slots extend in a direction perpendicular to the bore and the passageway within the liner and are aligned with each other across the bore. The slots in the two sections are also aligned with each other, with pin 23 in slots 43, 43 and pin 24 in slots 44, 44. The pins are thus constrained for movement in a direction perpendicular to the bore.

Cam members 26, 27 are rotatively mounted on stub shafts 46, 46 which project from the outer sides of the hub portions of the two sections of the valve body. These shafts are centered about an axis spaced midway between the pin slots and perpendicular to the axis of the liner and bore. Each of the cam members has a generally circular base wall 47 with an axially extending blind bore 48 on the inner side thereof in which the valve body shaft is received. The outer ends 46a of the shafts are rounded or curved, and the bottom walls 48a of the bores are flat so that the two can abut together without interfering with the rotation of the cam members. As best seen in FIG. 6, the shafts also have openings 49 through which the throttling pins can pass.

Each of the cam members also has a recessed area 50 on the inner side thereof which receives the end portions of throttling pins 23, 24. The recessed area is centered about the axis of rotation and has a side wall 51 which provides a cam surface for the pins, with the recessed areas and the cam surfaces on the two cam members being mirror images of each other. As best seen in FIG. 12, each of the cam surfaces follows the path of two relatively large circular arcs 51a, 51b joined together by smaller arcs 51c, 51d. Arcs 51a, 51b are disposed eccentrically, but symmetrically of the axis of rotation, as are arcs 51 c, 51 d. The diameters of the arcs are such that the pins are driven between fully open and fully closed positions as the cam members are rotated through an angle of approximately 90 degrees. Bores 48, 48, which are also centered about the axis of rotation, open through the bottom wall of recessed area 50.

Each cam member also has a pair of spacers or posts 52, 53 on the inner side of base wall 47. The spacers have mating surfaces 52a, 53a which maintain the base walls in precise parallel alignment, with the cam surfaces and axes of rotation aligned directly opposite each other to provide precise, parallel pin movement. The two cam members are held rigidly together by screws 54 and nuts 55, with screws passing through bores 56 in the spacers and the screw heads and nuts being received in counterbores 56a, 56b on the outer sides of the base walls.

The side walls of the spacers have arcuately curved flanges 58, 59 which serve as limiting abutments for the valve body when the valve is in its fully open and fully closed positions.

Cam member 26 differs from cam member 27 in that it has a latch pin 61 mounted on a flexible arm 62 in base wall 47 for locking engagement with a notch 63 on valve body 21 when the valve is in its fully closed position. The notches are formed between the hub and the flanges at both ends of each sections of the valve body, with the notches on each section opening in opposite directions. Each cam member also has an elongated knob or pointer 66 which is aligned parallel to the flow passageway or bore in the open position and perpendicular to it in the closed position.

The valve assembly is assembled by placing the liner 22 in the bore cavity 32 of one of the two sections of the valve body 21, fitting the other section of the valve body over the liner in registration with the first section, inserting the throttling pins 23, 24 through the slots 43, 44 in the valve body and the loops 37, 37 of the liners, positioning the cam members 26, 27 on opposite sides of the valve body with shafts 46 in bores 48 and the mating surfaces 52a, 53a aligned with each other, and inserting and tightening the screws 54 to clamp the two cam members rigidly together. With the cam members clamped tightly together, the rounded ends 46a of shafts 46 engage the flat bottom walls 48a of the bores 48, thereby clamping the two sections of the body securely together, while still permitting rotation of the cam members about the body.

In use, flanges 31, 31 are connected to corresponding flanges on a flow line (not shown), with gaskets 35, 35 providing fluid-tight seals between the valve assembly and the flow line fittings. In the fully open position illustrated in FIGS. 13A and 16A, the cam members are oriented such that the outer end portions of cam surface 51 are aligned lengthwise with slots 43, 44, and throttling pins 23, 24 are at the outer ends of the slots, with no squeezing of liner 22.

Figure 13B:
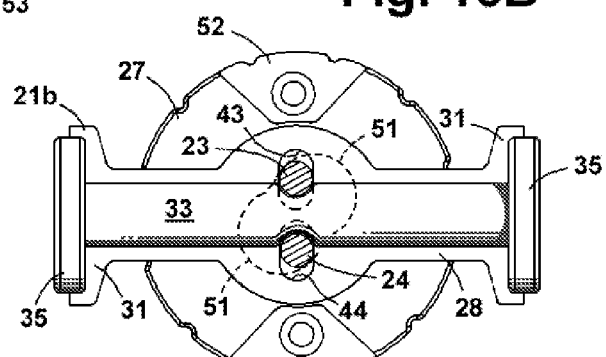

As the cam members are rotated in a clockwise direction, cam surface 51 bears against the throttling pins, pushing them toward each other against the side wall 33 of the liner to squeeze the side wall together and restrict flow through passageway 34, as shown in FIGS. 13B and 16B. As the pins move, the guide slots ensure that the movement is in a direction perpendicular to the side wall of the liner, and the cam members keep the two pins moving at the same speed, parallel to each other, and at equal distances from the axis of rotation so that the squeezing forces exerted on the two sides of the liner are identical.

Figure 13C:
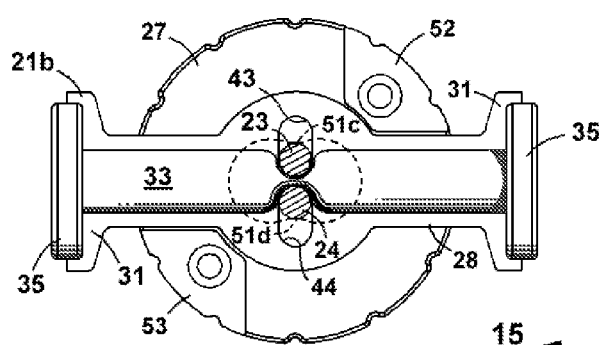
Figure 14:
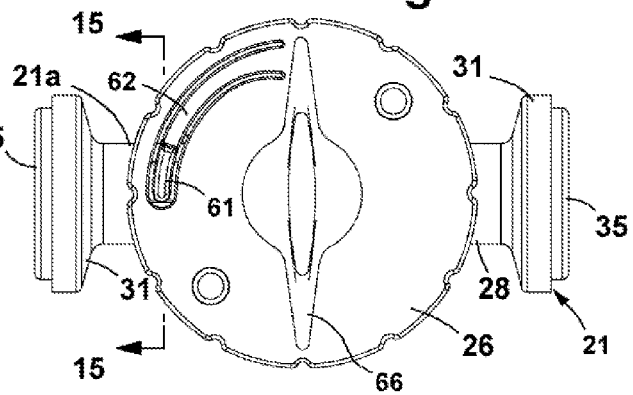
FIG. 14 is a front elevational view of the valve assembly in the embodiment of FIG. 1 in the closed position.
Figure 15:
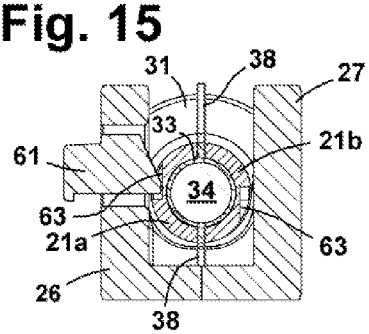
FIG. 15 is a cross-sectional view taken along line 15-15 in FIG. 14.

Further rotation in the clockwise direction will bring the valve to the closed position shown in FIGS. 13C and 16C, with the inner arcs 51c, 51d of the cam surface engaging the throttling pins and the pins at the inner ends of the guide slots. In this position, the walls of the liner are squeezed tightly together, blocking flow through passageway 34. Oversqueezing of the liner is, however, prevented by abutment of the pins against the walls at the inner ends of the slots. The curvature of arcs 51c, 51d corresponds to the curvature of the pins, and the pins tend to snap into position in those arcs. As the cam members reach the closed position, latch pin 61 snaps into notch 63, as best seen in FIG. 15, thereby locking the valve in that position.

Opening the valve is essentially the opposite of closing it. To move the valve away from the open position, the latch pin is disengaged from the notch, and the cam members are turned in the counterclockwise direction to release the squeeze on the liner and allow the passageway to open.

The invention has a number of important features and advantages. By squeezing the tubular liner together from both sides instead of just one, stressing and straining of the liner are substantially reduced, and the life of the liner is greatly extended. Having the throttling pins tightly constrained for movement parallel to each other and in a direction perpendicular to the side wall of the liner, with identical squeezing forces being applied to both sides of the liner, further reduces stress and strain, avoids friction between the valve body and the liner and enhances the life of the liner even further. The guide slots also prevent over-squeezing of the liner by limiting the travel of the pins toward each other.

With the liner and gaskets formed as a continuous structure, there are no crevices or other areas in which contamination can collect, making the valve assembly particularly suitable for use in an aseptic or sterile environment. Moreover, with the liner fully supported by the valve body at all times, expansion of the liner is closely controlled, and the liner can, therefore, sustain high pressures with a very thin elastomer material.

With the liner having flanges clamped between the two sections of the valve body, the liner is protected from collapsing under negative pressures, and there are no crevices or other areas where contamination can collect between the two sections, thus ensuring that the valve assembly will remain substantially free of contamination outside as well as within.

Finally, the design of the valve assembly makes it easy to assemble and ensures proper assembly, thus making replacement of the liner or liner an easy matter as well.

It is apparent from the foregoing that a new and improved inline valve assembly has been provided. While only certain presently preferred embodiments have been described in detail, as will be apparent to those familiar with the art, certain changes and modifications can be made without departing from the scope of the invention as defined by the following claims.

The invention claimed is:

1. An inline valve assembly, comprising a valve body having an axially extending circular bore and guide slots extending in a direction perpendicular to the bore, a flexible tubular liner having an axially extending flow passageway with a generally cylindrical side wall disposed in and supported by the bore, stub shafts extending from opposite sides of the valve body, cam members rotatably mounted on the stub shafts and connected together for rotation in concert on opposite sides of the valve body, throttling pins mounted in the guide slots on opposite sides of the liner with end portions of the throttling pins extending into recessed areas in the cam members, and cam surfaces formed by side walls of the recessed areas in driving engagement with the end portions of the throttling pins for urging the pins together against the side wall of the liner to squeeze the liner on both sides in a substantially identical manner to restrict flow through the passageway.

2. The valve assembly of claim 1 wherein the valve body comprises an elongated housing with connecting flanges at opposite ends thereof, and the liner has a tubular body with gaskets that form seals with outer sides of the flanges.

3. The valve assembly of claim 2 wherein the tubular body and the gaskets are molded as a unitary structure of a single material, with the passageway extending continuously and smoothly through the tubular body and the gaskets, with no crevices or other areas in which contamination can collect.

4. The valve assembly of claim 1 wherein the liner has loops which encircle the throttling pins.

5. The valve assembly of claim 1 including cavities formed in the valve body in communication with opposite sides of the bore between the guide slots to permit controlled expansion of the liner in a direction parallel to the pins as the liner is squeezed together between the pins.

6. The valve assembly of claim 1 wherein each of the cam members has a generally circular end wall in which the recessed area and a bore for the stub shaft are formed and spacers which position the end walls of the two cam members parallel to each other, with the side walls of the recessed areas in the two cam members aligned to keep the throttling pins parallel to each other and moving in a substantially identical manner to apply substantially equal forces to both sides of the liner.

7. The valve assembly of claim 1 including a latch pin on one of the cam members engagable with a notch in the valve body to hold the valve assembly in a closed position.

8. The valve assembly of claim 1 wherein the liner is fabricated of a material selected from the group consisting of EPDM rubber, polytetra-fluoroethylene (PTFE), and other elastomers.

9. The valve assembly of claim 1 wherein the guide slots have end walls that limit travel of the throttling pins toward each other and prevent over-squeezing of the liner.

10. An inline valve assembly, comprising a valve body formed in two sections with an axially extending circular bore and guide slots extending in a direction perpendicular to the bore, a flexible tubular liner having an axially extending flow passageway with a generally cylindrical side wall disposed in and supported by the bore and a flange that extends lengthwise of and outwardly from the side wall and is secured between the two sections of the valve body, throttling pins mounted in the guide slots on opposite sides of the liner, and cam members which are connected together for rotation in concert on opposite sides of the valve body and have cam surfaces that engage end portions of the throttling pins and urge the pins together against the side wall to squeeze the liner on both sides in a substantially identical manner to restrict flow through the passageway.

11. The valve assembly of claim 10 wherein the guide slots have end walls that limit travel of the pins toward each other and protect the liner from being squeezed too tightly.

12. The valve assembly of claim 10 wherein the valve body has connecting flanges at opposite ends thereof, the flexible liner has a tubular body with radially extending gaskets formed integrally with and at opposite ends of the tubular body, with the flow passageway extending continuously and smoothly through the tubular body and the gaskets with no crevices or other areas in which contamination can collect, the tubular body fitting snugly in the bore and being supported radially by the valve body throughout substantially the entire length of the tubular body, and the gaskets positioned on the outer sides of the connecting flanges for sealing engagement with corresponding connectors in an external line.

13. The valve assembly of claim 12 wherein the tubular body and the gaskets are molded as a unitary structure of a single material.

14. An inline valve assembly, comprising:

a flexible liner having an elongated tubular body with an axially extending flow passageway, radially extending gaskets at opposite ends of the tubular body, loops extending from opposite sides of the tubular body, and flanges that extend lengthwise of the tubular body and outwardly from the opposite sides of the tubular body, with gaps between the loops and the flanges permitting limited movement of the tubular body and the loops relative to the flanges;

a split valve body having an elongated housing formed in two sections with connector fittings at opposite ends thereof, an axial bore extending through the housing and the fittings, the tubular body of the liner extending through the bore, the gaskets positioned on the outer sides of the connector fittings for making fluid-tight connections between the liner and an external flow line, the liner flanges disposed between the two sections of the valve body, shafts extending from opposite sides of the valve body along an axis of rotation perpendicular to the axis of the bore, and guide slots spaced equally from the axis of rotation extending in a direction perpendicular to the axis of the bore on opposite sides of the bore;

laterally movable throttling pins passing through the loops on opposite sides of the liner and constrained by the guide slots in the valve body for movement parallel to each other along a line perpendicular to the liner; and cam members which are mounted on the shafts extending from the valve body and are connected together for rotation in concert, with cam surfaces disposed eccentrically of the axis of rotation engaging the throttling pins for pushing the pins together to squeeze the liner from opposite sides in a similar manner to restrict flow through the passageway.

15. The valve assembly of claim 14 wherein the body shafts are received in aligned bores in the cam members, with rounded ends of the shafts engaging flat bottom walls of the aligned bores.

16. The valve assembly of claim 15 wherein the cam members are connected together by screws, and the two sections of the valve body are held together by the bottom walls of the bores.

17. The valve assembly of claim 14 including a latch pin on one of the cam members engagable with a notch in the valve body to hold the valve assembly in a predetermined position.

18. The valve assembly of claim 14 including cavities formed in the valve body in communication with opposite sides of the axial bore between the guide slots to permit controlled expansion of the liner in a direction parallel to the pins as the liner is squeezed together between the pins.

19. The valve assembly of claim 14 wherein the cam members have generally circular base walls with recessed areas having side walls that form the cam surfaces, and the aligned shaft bores extend from the recessed areas.

20. The valve assembly of claim 14 wherein the shafts extending from the valve body have laterally extending openings through which the throttling pins pass in moving toward and away from each other.

21. The valve assembly of claim 14 wherein the guide slots have end walls that limit travel of the throttling pins toward each other and prevent over-squeezing of the liner.

\* \* \* \* \*